UNITED STATES PATENT OFFICE.

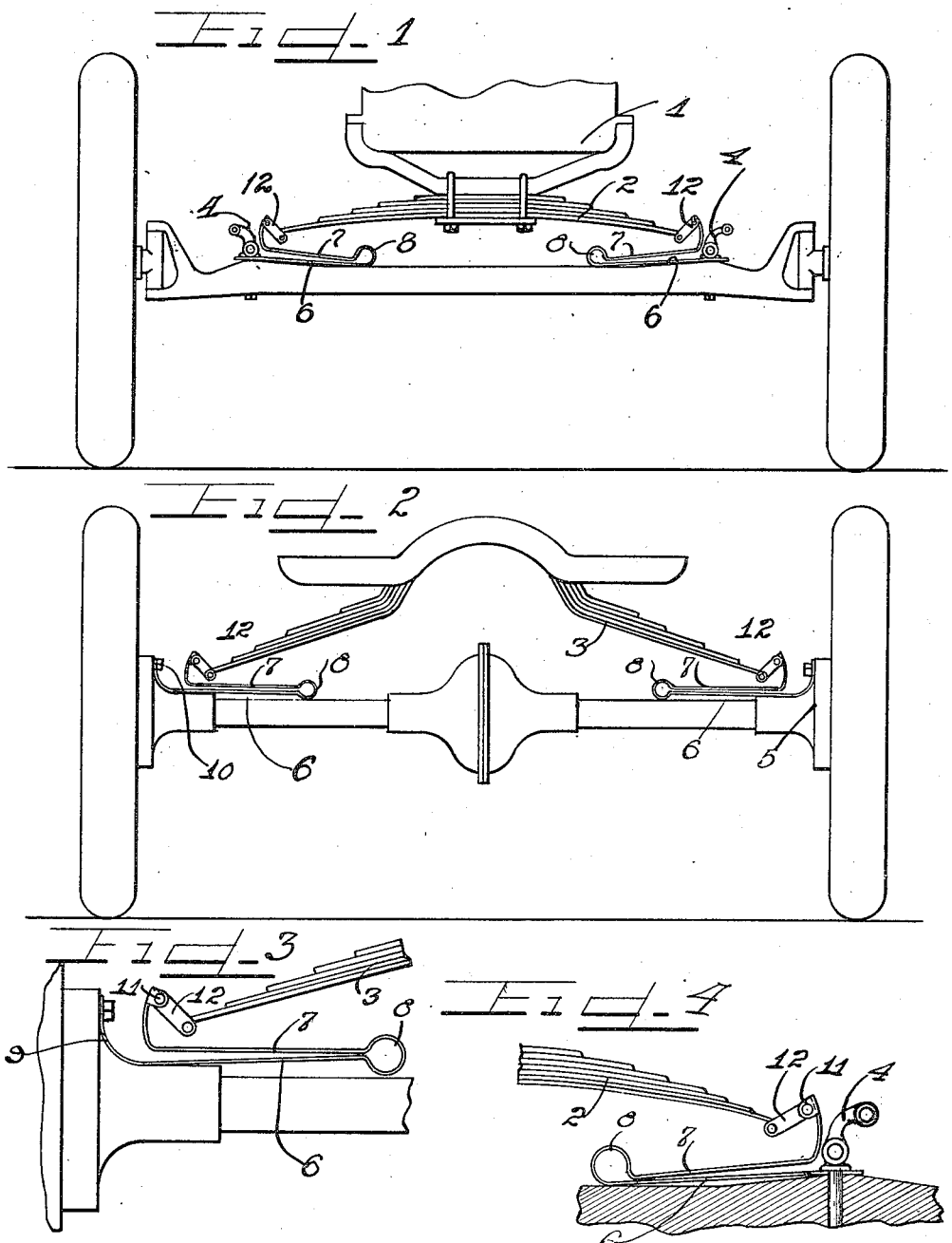

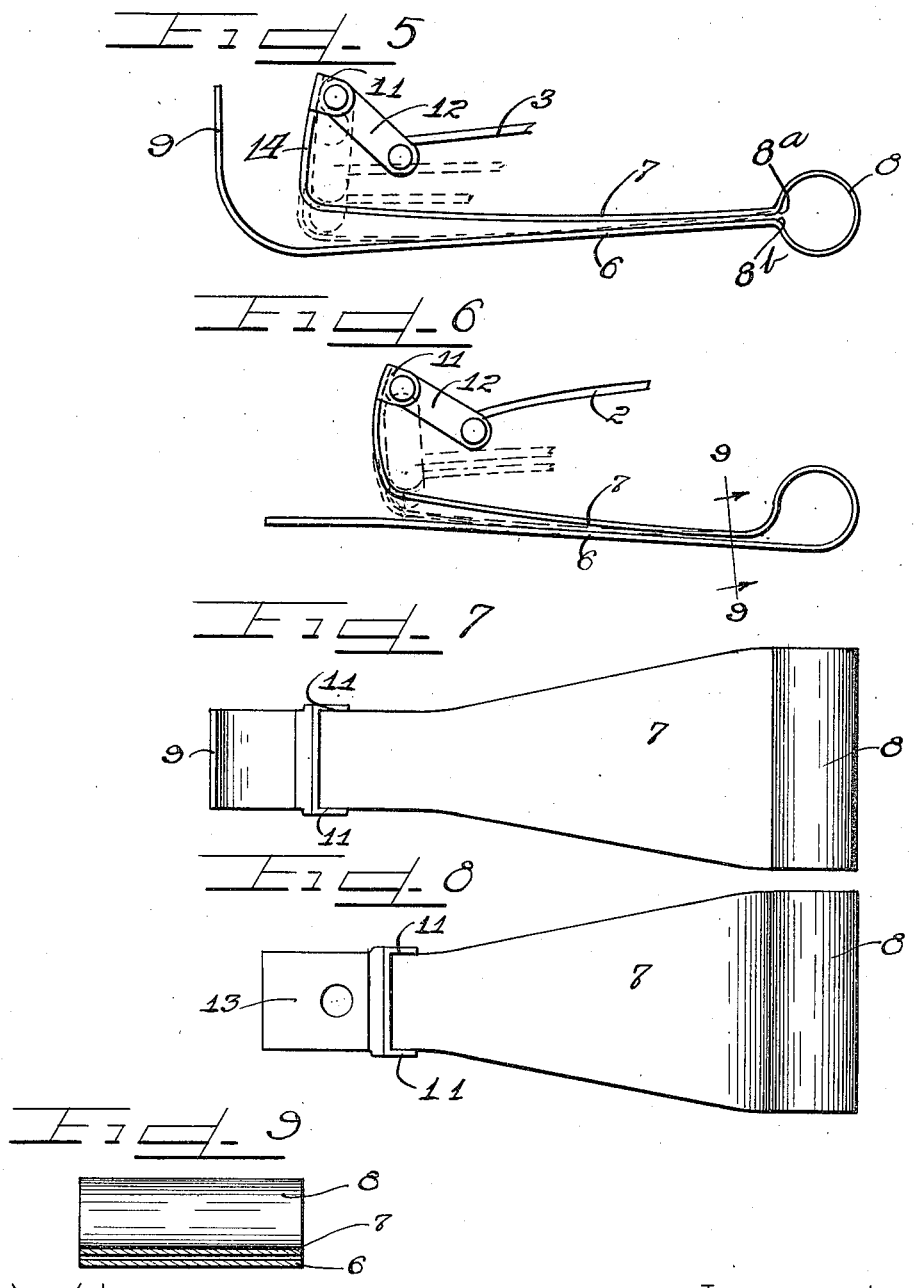

NATHAN SCHACHTER, OF CHICAGO, ILLINOIS.

SHOCK-ABSORBER.

1,311,531. Specification of Letters Patent. Patented July 29, 1919.

Application filed September 4, 1917. Serial No. 189,584.

*To all whom it may concern:*

Be it known that I, NATHAN SCHACHTER, a former subject of the King of Roumania, who have declared my intention of becoming a citizen of the United States, and a resident of the city of Chicago, in the county of Cook and State of Illinois, have invented certain new and useful Improvements in Shock-Absorbers; and I do hereby declare that the following is a full, clear, and exact description of the same, reference being had to the accompanying drawings, and to the numerals of reference marked thereon, which form a part of this specification.

It is an object of this invention to provide a very powerful and yet simple auxiliary spring which may be attached to the main spring of an automobile and which coöperates therewith in taking up the stress of the load.

It is also an object of this invention to provide a spring of the class described in which, as the load increases, one member of the spring is adapted to pivot on the other member with a constantly decreasing radius thereby bringing the maximum strength of the spring in operation as the load increases.

It is further an object of this invention to provide an auxiliary leaf spring adapted to utilize the frictional contact or rubbing of two leaf members in conjunction with the spring action thereof to assist in absorbing the shock.

It is further an object of this invention to provide an auxiliary spring which is cheap to construct and in which the strength may be increased by simply widening the spring so that a very powerful spring may be obtained in a cheap and economical manner.

It is further an object of this invention to provide a spring of the character described which may be easily and quickly attached to any car without necessitating any alterations to the standard constructions.

Other and further important objects of this invention will be apparent from the disclosures in the drawings and specification.

The invention is illustrated in the drawings, and hereinafter more fully described.

In the drawings:

Figure 1 is the front elevation of an automobile showing auxiliary springs embodying my invention connected to the front spring.

Fig. 2 is the rear elevation of an automobile showing springs comprising my invention connected to the rear springs thereof.

Fig. 3 is an enlarged fragmentary detail illustrating the method of connecting the auxiliary springs to the rear springs.

Fig. 4 is an enlarged fragmentary detail illustrating the method of connecting the auxiliary springs to the front spring of the vehicle.

Fig. 5 is an enlarged view of the rear auxiliary spring.

Fig. 6 is an enlarged view of the front auxiliary spring.

Fig. 7 is a top plan view of the spring shown in Fig. 5.

Fig. 8 is a top plan view of the spring shown in Fig. 6.

Fig. 9 is a section taken on line 9—9 of Fig. 6.

As shown on the drawings:

1 indicates an automobile, 2 the front spring thereof, 3 the rear springs, 4 the steering knuckles, and 5 the brake housing. The auxiliary spring and absorber embodying my invention comprises a bar or plate of spring metal bent to form an upper and a lower leaf 6 and 7, which are connected by a strong spring or cylindrical portion 8, having the ends $8^a$—$8^b$, spaced a short distance apart, about an eighth of an inch more or less according to the size and requirements. The spring is broad at the connected ends and tapers toward the free ends. The forward end of the leaf spring 6, shown in Fig. 5, is directed upwardly and is provided with an aperture in the end 9, thereof, and is adapted to receive one of the bolts 10, of the brake housing therethrough to rigidly secure the same on the rear axle of the car. The free end 14, of the leaf spring member 7, is also directed upwardly and is provided with a plurality of lugs 11. Pivotally connected between said lugs 11, is a link member 12, which at its opposite end is pivotally connected to the end of the spring 3. The construction disclosed in Fig. 6, is substantially the same with the exception that the forward end of the leaf spring 6, lies in the same plane with the rest of the leaf and is apertured and adapted to receive the steering knuckles of the car therethrough, which in turn rigidly secures the same in place upon the front axle of the automobile.

The operation is as follows:

In the construction shown in Figs. 2 and 5, the upwardly directed end 9, of the spring is connected to the brake housing as shown while the end 14 of the leaf spring 7, is connected to the main spring 3, by means of a link 12, which is the usual link furnished with stock cars for attaching the main spring to the knuckle. In the construction shown in Figs. 1 and 6, the end of the spring 6, lies flat on the axle and is engaged between the steering knuckle and axle, as is readily seen by referring to Fig. 4. Under the normal load the auxiliary spring supports the main spring with the gap between the ends $8^a$—$8^b$, as shown in any of the figures. When the main spring under compression or shock is flattened or compressed this in turn tends to force the link 12, as shown in dotted lines in Figs. 5 and 6, which in turn compresses the leaf 7, against leaf 6, and the leaves at $8^a$—$8^b$ come together, after which one leaf rubs on the other relatively thereof utilizing the friction between the leaves as well as the resistance of spring 8. When the leaves are flat together the relative rubbing between the two act to absorb considerable of the shock and one leaf has a tendency to pivot on the other with a constantly changing radius until the maximum strength of the spring is utilized, in which case leaf 7, lies flat on leaf 6.

By the use of an auxiliary spring such as herein described the strength of the spring is readily and easily increased by simply widening the same at the cylindrical end. It is also seen that the leaf spring member 7, utilizes the leaf spring member 6, as a bearing and that the radius of operation is constantly changing under the varying stresses of the load. This provides a very powerful spring which is cheap to construct and is not likely to break under the most severe operation.

Many details of construction may be varied and numerous changes may be made without departing from the principles of my invention and I therefore do not desire to limit the patent when issued otherwise than necessitated by the prior art.

I claim as my invention:

1. The combination with a pair of relatively movable vehicle parts of a shock absorber therefor comprising a pair of normally spaced members adapted to be frictionally engaged by relative movement of said vehicle parts, and means for imparting a relative sliding movement to the frictionally engaged members by additional relative movement of the said vehicle parts.

2. The combination with a pair of relatively movable vehicle parts of a shock absorber therefor comprising a pair of normally spaced members provided with flat engaging surfaces adapted to be frictionally engaged by relative movement of said vehicle parts, a spring for normally holding the said members apart, and means for imparting a relative sliding movement to the frictionally engaged members by additional relative movement of the said vehicle parts.

3. The combination with a pair of relatively movable vehicle parts, of a shock absorber therefor comprising a plate spring having a circular bight portion and a pair of normally separated arms diverging therefrom, and means connecting the outer ends of said arms with the said vehicle parts, whereby the arms are initially pressed together and subsequently slid relatively lengthwise thereof by relative movement of the vehicle parts.

4. The combination with a pair of relatively movable vehicle parts, of a shock absorber therefor comprising a plate spring formed with a circular central hinge portion and a pair of arms normally separated and diverging therefrom so as to initially engage at the inner ends thereof adjacent the loop and progressively engage closer to the outer ends thereof as the outer ends of the arms are forced together, and means for connecting the spring with the vehicle parts whereby the arms of the spring are pressed together by a relative movement of the vehicle parts and thereafter slid longitudinally and relatively by additional relative movement of the vehicle parts.

5. The combination with a pair of relatively movable vehicle parts, of a shock absorber therefor comprising a plate spring formed with a central circular resilient hinge portion having a pair of normally spaced arms, tapered and diverging outwardly from the hinge portion so as to initially engage at their inner ends and progressively engage closer to the outer ends thereof, as the outer ends are pressed together, and means for connecting the outer ends of the arms with the vehicle parts whereby the arms are initially pressed together by relative movement of said parts and whereby one of said arms is moved longitudinally in frictional engagement with the other arm by additional relative movement of the said vehicle parts.

6. The combination with a pair of relatively movable vehicle parts, of a shock absorber therefor comprising a pair of members adapted for sliding frictional engagement, means for fixedly connecting one of said members with one of the vehicle parts, and loose motion means connecting the other member with the other vehicle part whereby sliding engagement of the said members is effected subsequently to an initial relative movement of the said vehicle parts.

7. The combination with a vehicle part, of a shock absorber mounted on said part and comprising a plate spring having a pair of correspondingly extending arms adapted for relative longitudinal movement, a lateral projection at the outer end of one of said arms and a vehicle part movable relatively to the first mentioned vehicle part and connected with said lateral projection whereby the last mentioned arm is slid longitudinally of the other arm by the relative movement of the vehicle parts.

8. The combination with a pair of relatively movable vehicle parts, of a shock absorber therefor comprising a plate spring folded so as to have a pair of diverging arms adapted to be pressed together by relative movement of the vehicle parts, means for supporting one of the arms on one of the vehicle parts against longitudinal movement, a lateral projection at the outer end of the other arm, a link connecting the projection with the other vehicle part, and means for limiting the movement of the link.

9. The combination with a vehicle part and a semi-elliptic spring coöperating therewith, of a shock absorber at each end of the spring comprising a spring plate folded upon itself and having a pair of diverging arms adapted to be pressed into frictional engagement, and means whereby the arms are pressed together by approximation of the spring and vehicle part and whereby one arm is slid longitudinally on the other arm by longitudinal extension of the semi-elliptic spring.

10. The combination with a vehicle part of a semi-elliptic spring coöperating therewith, of a shock absorber spring at each end thereof comprising a plate spring folded upon itself and having a pair of diverging arms, means for connecting one of said arms with the vehicle part, an oscillating link connecting the end of the semi-elliptic spring with the free end of the other arm, and a stop for limiting the oscillation of the link.

11. The combination of a vehicle part and a semi-elliptic spring coöperating therewith, of a shock absorber spring at each end thereof comprising a plate spring folded upon itself and having a pair of diverging arms, means for supporting one of said arms on the vehicle part against longitudinal movement, a lateral projection at the outer end of the other arm, and a link at the outer end of said arm pivotally connected with the outer end of the semi-elliptic spring and adapted to be moved by longitudinal extension of the semi-elliptic spring into engagement with the lateral projection of the said arm.

12. A shock absorber for vehicles having a leaf spring comprising a plate spring folded so as to have a pair of diverging arms, the end of one arm being connected to the frame of the vehicle, the end of the other arm being connected by a link to one end of the leaf spring, approximately one-half of said plate spring being in contact with and supported by the frame, the plate spring being so formed and located that compression of the leaf spring presses said half of the plate spring toward the frame.

13. A shock absorber for vehicles having a leaf spring comprising a pair of plate springs each folded so as to have a pair of diverging arms, each end of the leaf spring being connected by a link to one end of an arm of one of the plate springs, the other arm of each plate spring being in contact with and supported by the frame, the plate springs being so formed and located that compression of the leaf spring presses the last mentioned arm toward the frame.

14. A shock absorber for vehicles having a leaf spring comprising a pair of independent auxiliary springs adjacent each end of the leaf spring, a pivotal connection between one end of each auxiliary spring and the adjacent end of the leaf spring and a rigid connection between the other end of each auxiliary spring and the frame of the vehicle.

15. A shock absorber for vehicles having a leaf spring comprising a pair of independent auxiliary plate springs adjacent each end of the leaf spring, one end of each leaf spring being in contact with the frame of the vehicle, and a link connecting the other end of each plate spring to the adjacent end of the leaf spring, said last mentioned ends of the plate spring being adapted operatively to engage and be supported by the frame of the vehicle when the leaf spring is compressed.

In testimony whereof I have hereunto subscribed my name in the presence of two subscribing witnesses.

NATHAN SCHACHTER.

Witnesses:
 CHARLES W. HILLS, Jr.,
 EARL M. HARDINE.

Copies of this patent may be obtained for five cents each, by addressing the "Commissioner of Patents, Washington, D. C."